(12) United States Patent
Amagai et al.

(10) Patent No.: US 7,910,241 B2
(45) Date of Patent: Mar. 22, 2011

(54) BATTERY OUTER CASE FOR RECEIVING A FLAT BATTERY PACK JOINED BY SEAM-ROLLING

(75) Inventors: Ryuichi Amagai, Isehara (JP); Etsuo Oogami, Atsushi (JP); Seijirou Yajima, Kanagawa (JP); Teruo Segawa, Ayase (JP); Kazuhiko Tsukada, Yokohama (JP)

(73) Assignees: Nissan Motor Co., Ltd., Yokohama-Shi (JP); Toyo Seikan Kaisha, Chiyoda-ku (JP)

( * ) Notice: Subject to any disclaimer, the term of this patent is extended or adjusted under 35 U.S.C. 154(b) by 1172 days.

(21) Appl. No.: 11/225,828

(22) Filed: Sep. 13, 2005

(65) Prior Publication Data

US 2006/0121344 A1 Jun. 8, 2006

(30) Foreign Application Priority Data

Sep. 22, 2004 (JP) ................................. 2004-276250

(51) Int. Cl.
*H01M 2/04* (2006.01)
*H01M 2/02* (2006.01)

(52) U.S. Cl. ........ 429/163; 429/162; 429/176; 429/177; 429/178; 429/179

(58) Field of Classification Search .......... 429/162–187, 429/233, 96–100
See application file for complete search history.

(56) References Cited

U.S. PATENT DOCUMENTS

| | | | | |
|---|---|---|---|---|
| 3,745,035 A | * | 7/1973 | Troughton et al. | 427/181 |
| 4,642,922 A | * | 2/1987 | Prudenziati | 38/81 |
| 5,662,718 A | | 9/1997 | Tuttle | |
| 6,225,778 B1 | * | 5/2001 | Hayama et al. | 320/112 |
| 6,410,186 B1 | | 6/2002 | Tucholski et al. | |
| 6,447,949 B2 | * | 9/2002 | Iwata et al. | 429/185 |
| 6,451,476 B1 | | 9/2002 | Chang et al. | |
| 2004/0002000 A1 | * | 1/2004 | Oogami et al. | 429/162 |
| 2004/0038126 A1 | * | 2/2004 | Gu | 429/162 |

FOREIGN PATENT DOCUMENTS

| | | | |
|---|---|---|---|
| GB | 356271 | | 9/1931 |
| JP | 01-281665 | | 11/1989 |
| JP | 2001-126678 A | * | 11/2001 |

* cited by examiner

*Primary Examiner* — Dah-Wei D Yuan
*Assistant Examiner* — Kwang Han
(74) *Attorney, Agent, or Firm* — Burr & Brown

(57) ABSTRACT

A battery outer case can provide space saving by reducing the length of protrusion of joint portions between a metal container main body and a metal lid, is free from a thermal influence, and can make it unnecessary to employ additional or extra parts such as a gasket. The battery outer case includes the metal container main body having at least one surface opened with a flat battery pack composed of flat type batteries received therein, and a metal lid for closing an opening formed in the metal container main body. The inside of the container is in communication with the outside thereof so as to have air permeability, and an open end periphery of the metal container main body and a lid end periphery of the metal lid are joined to each other by seaming.

6 Claims, 4 Drawing Sheets

BATTERY OUTER CASE FOR RECEIVING A FLAT BATTERY PACK JOINED BY SEAM-ROLLING

This application claims the benefit of Japanese Application No. 2004-276250, filed Sep. 22, 2004, the entirety of which is incorporated herein by reference.

BACKGROUND OF THE INVENTION

1. Field of the Invention

The present invention relates to a battery outer case that houses a flat battery pack such as, for example, a laminate cell battery, etc., composed of a plurality of thin batteries laminated one over another.

2. Description of the Related Art

As a battery outer case in which this kind of flat battery pack is housed, there can be considered such a one as shown in FIGS. 4A through 4F.

Specifically, a battery outer case 100 shown in FIG. 4A includes a metal container main body 102 in which a flat battery pack 101 is housed therein, and a metal lid 103 that serves to close an opening formed in the metal container main body 102. An outwardly protruding connection flange 104 is formed at an open end of the metal container main body 102, and a connection flange 105, similarly protruding outwards, is formed on an end portion of the metal lid 103, with the respective connection flanges 104, 105 being superposed and coupled with each other by means of spot welding or caulking. As such a caulking technique, there can be used eyelets, so-called TOX (a registered trademark of TOX PRESSOTECHNIK Co., Ltd.) joints, etc.

In FIG. 4B, a metal container main body 102 is formed at its open end with a joint piece 106 extended upwards therefrom for connection, and a metal lid 101 is also formed on its outer periphery with an upwardly extending joint piece 107, the joint pieces 106, 107 being superposed and coupled with each other by means of spot welding or caulking.

In the jointing or coupling techniques as shown in FIG. 4A and FIG. 4B, however, there is the following problem. That is, in any case of spot welding and caulking joint, it is necessary for the joint pieces 106, 107 of the connection flanges 104, 105 to have their widths X1, Y1 of at least 7 to 10 mm as a welding margin or a caulking margin, and hence the occupation space thereof becomes accordingly large.

Thus, as shown in FIG. 4C and FIG. 4D, it is considered that an edge of a metal lid 103 is placed in abutment with a corresponding edge of a metal container main body 102 while eliminating the above-mentioned connection flanges and joint pieces, and abutment portions 108 of the metal lid 103 and the metal container main body 102 are joined with each other by laser welding (for example, Japanese patent application laid-open No. 2004-14125).

In such a case of abutment joint or connection, however, spatter generated upon welding can be easily dispersed into the inside of the container, and heat can also be transmitted to the inside of the container, so the flat battery pack 101 is liable to be damaged. In particular, in the case of a thin battery with its exterior being formed of a laminate film, the laminate layer can be damaged to induce a reduction in electrical insulation.

FIG. 4E shows an example in which a metal container main body 102 and a metal lid 103 are coupled with each other by means of bolts 109. In this example, each bolt 109 has its bolt shaft portion 109a inserted into a bolt hole formed in the metal lid 103, and its bolt head 109b engaged with the metal lid 103, with an end of the bolt shaft portion 109a being threaded into a bottom plate portion 102a of the metal container main body 102.

In this case, however, there arises another problem. That is, the bolt head 109b of each bolt 109 projects from an upper surface of the metal lid 103, so the occupation space of the entire apparatus is accordingly increased by the height of each bolt head 109b, and at the same time, the entire weight thereof is also increased by the weight of all the bolts 109.

In addition, it can be further considered that a caulking structure used in a cylindrical battery or the like is employed, as shown in FIG. 4F. This caulking structure is such that a lid body 203 is inserted into the inner periphery of an open end portion of a metal container main body 201 through a ring-shaped gasket 202, and is then fixedly secured to the metal container main body 201 by caulking or bending the open end portion thereof inwardly.

In the case of such a caulking structure, however, the gasket 202 is needed as an additional part, resulting in an increase in the number of required parts.

SUMMARY OF THE INVENTION

Accordingly, the present invention has been made to solve the problems as referred to above, and has for its object to provide a battery outer case for a flat battery pack in which the length of protrusion of joint portions between a metal container main body and a metal lid can be reduced to achieve space saving, and which is free from the influence of heat and makes it unnecessary to employ additional or extra parts such as a gasket, etc.

In order to achieve the above object, according to one aspect of the present invention, there is provided a battery outer case comprising: a metal container main body having at least one surface opened with a flat battery pack received therein; and a metal lid that serves to close an opening formed in the metal container main body; wherein the inside of the container is in communication with the outside thereof so as to have air permeability, and an open end periphery of the metal container main body and a lid end periphery of the metal lid are joined to each other by seaming.

In a first preferred form of the present invention, the flat battery pack comprises a laminate battery pack provided with an exterior member that is composed of a synthetic resin layer and a metal layer laminated one over the other.

In a second preferred form of the present invention, the metal container main body is provided with notched holes through which terminals connected to the flat battery pack inside the container are exposed.

In a third preferred form of the present invention, the metal container main body has a peripheral portion around each of the notched holes which is more rigid than the other portions thereof.

In a fourth preferred form of the present invention, a reinforcement bead is formed at a location near each of the notched holes in the metal container main body so as to provide high rigidity.

In a fifth preferred form of the present invention, the metal container main body has a turned back portion formed around each of the notched holes so as to provide high rigidity.

In a sixth preferred form of the present invention, the metal container main body and the metal lid have at least their inner surfaces coated with insulating layers, respectively.

According to another aspect of the present invention, there is provided an assembling method for a battery outer case comprising the steps of: molding a metal container main body with notched holes formed beforehand in its body portion for exposing terminals connected to a flat battery pack; receiving the flat battery pack in the metal container main body while fitting the terminals into the notched holes; covering the metal container main body with a metal lid; and superposing an open end portion of the metal container main body and an end portion of the metal lid with each other thereby to join them to each other by double seaming.

According to the above-mentioned first aspect of the present invention, since seam portions are constructed to be crushed toward the metal container main body, the length of protrusion of the seam portions from the metal container main body can be reduced as much as possible, so the metal container main body and the lid body can be joined to each other in a relatively small space.

In addition, since the seam joint between the metal container main body and the lid body can be done by seaming, there is no fear that the flat battery pack might be thermally damaged or the container might be thermally deformed, as would be caused by welding.

Moreover, since it is constructed such that the seam joint between the metal container main body and the metal lid is carried out by making use of part of themselves, any additional parts are not required to this end. Further, since it is also constructed such that the inside of the container is in communication with the outside thereof to have air permeability, even if gas generated in the thin batteries constituting the flat battery pack flows out to the outside of the thin batteries, the gas can escape to the outside of the container.

The present invention is optimal for the structure in which the flat battery pack is composed of laminate type batteries laminated one over another, as stated in the above-mentioned first preferred form of the invention. Thus, there is no influence of heat on the laminate type batteries, so it is possible to reduce the occupation space of the container itself as much as possible. As a result, the light-weight and small-size characteristics, which are major features of the laminate type batteries, are not disturbed or reduced.

According to the above-mentioned second preferred form of the present invention, since the metal container main body is provided with notched holes through which terminals connected to the flat battery pack are exposed, the flat battery pack can be smoothly received in the metal container main body.

In addition, in the case of the presence of the notched holes, the peripheral portions around the notched holes become liable to be deformed upon seaming, but such seaming can be performed without causing deformation by making the peripheral portions around the notched holes more rigid than the other portions, as stated in the above-mentioned third preferred form of the present invention, by reinforcing the peripheral portions around the notched holes by means of the reinforcement beads or the turned back portions as stated in the above-mentioned fourth or fifth preferred form of the present invention.

According to the above-mentioned sixth preferred form of the present invention, by coating at least the inner surfaces of the metal container main body and the metal lid with an insulating layer, it is possible to provide electrical insulation against exposed tabs of the thin batteries. Moreover, since the thin batteries themselves are laminated, insulation becomes doubled, thus making it possible to improve insulation performance.

Further, in case where the turned back portions are provided at the ends of the notched holes, the sections of the notched holes can be electrically insulated.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 4A through FIG. 4F show conventional battery outer cases, respectively, in which FIG. 4A is a cross sectional view schematically showing a container with joint flanges for spot welding or caulking; FIG. 4B is a cross sectional view schematically showing a container with joint pieces for spot welding or caulking; FIG. 4C and FIG. 4D are cross sectional views schematically showing the containers and lids of FIG. 4A and FIG. 4B which are joined to each other by laser welding, respectively, with the joint flanges and the joint pieces being eliminated; FIG. 4E is a cross sectional view schematically showing a container with a lid bolted thereto; and FIG. 4F is a cross sectional view of essential portions of a cylindrical battery showing a caulking structure of a lid.

DETAILED DESCRIPTION OF THE INVENTION

Now, the preferred embodiments of the present invention will be described below while referring to the accompanying drawings.

Figure 1A:
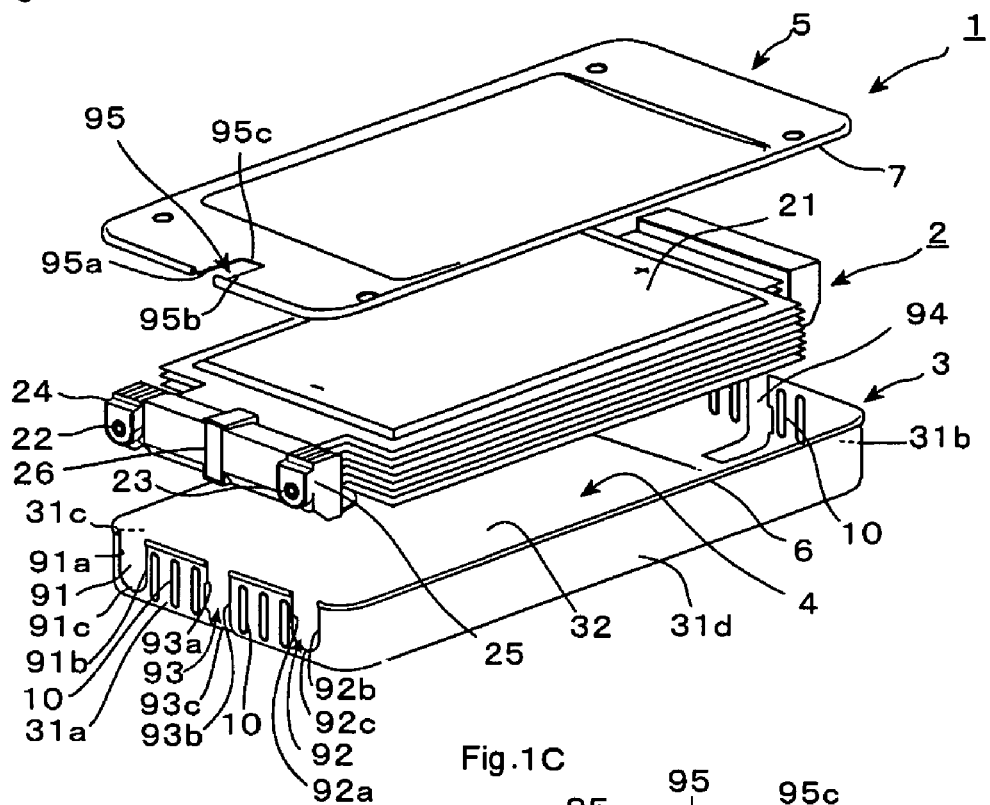
FIG. 1A is an exploded perspective view of a battery outer case according to one embodiment of the present invention.
Figure 1B:
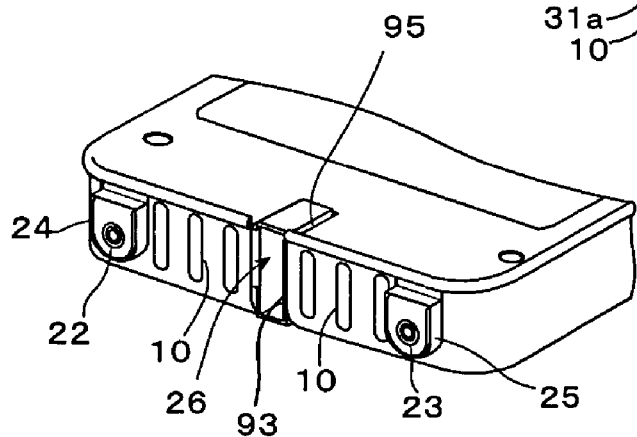
FIG. 1B is a perspective view of essential portions of the battery outer case of FIG. 1A when assembled.
Figure 1C:
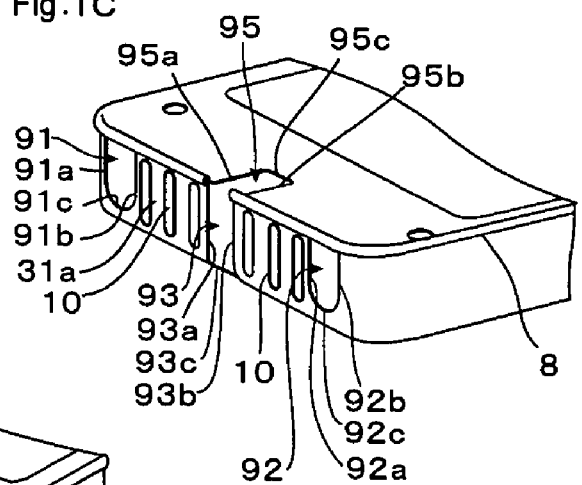
FIG. 1C is a perspective view of the battery outer case with an internal battery in FIG. 1B being removed.

FIG. 1 shows a battery outer case according to one embodiment of the present invention.

The battery outer case, generally designated at 1, includes a metal container main body 3 with an open upper surface and having a flat battery pack 2 housed or received therein, and a metal lid 5 that serves to close an opening 4 formed in the metal container main body 3, an open end periphery 6 of the metal container main body 3 and a lid end periphery 7 of the metal lid 5 being joined to each other by seaming. To this end, seam portions 8 are formed at the joint portions of the open end periphery 6 of the metal container main body 3 and the lid end periphery 7, respectively.

The flat battery pack 2 is constructed as follows. That is, inside a battery exterior composed of a laminate film there are laminated or stacked a plurality of serially connected laminate type batteries 21 in the form of a plurality of rectangular-shaped thin batteries, each of which is formed by sealing power generation elements each composed of a plus and a minus electrode plate and a separator laminated one over another. Thus, the laminate type batteries 21 are assembled into a vertically flat hexahedral shape as a whole, and a plus terminal 22 and a minus terminal 23 are arranged at the opposite ends of a short side of the flat hexahedral body, the plus terminal 22 and the minus terminal 23 being covered with a pair of terminal insulation resin covers 24, 25. In addition, a voltage measuring connector 26 is arranged at a location between the plus terminal 22 and the minus terminal 23 for measuring the voltage of each of the laminate type batteries 21.

The metal container main body 3 takes the shape of a thin box, and includes a body portion 31 of a polygonal cylindrical configuration which surrounds the flat battery pack 2, and a bottom plate portion 32 which closes a lower end of the body portion 31 and on which a lower surface of the flat battery pack 2 is placed. The cross-sectional shape of the body portion 31 is rectangular with rounded corners, conforming to the planar shape of the flat battery pack, and includes a first side wall 31a and a second side wall 31b on a short side, and a third side wall 31c and a fourth side wall 31d on a long side. The height of the body portion 31 is set to be substantially the same as the height of the flat battery pack 2.

The metal lid 5 takes the form of a thin plate-shaped configuration, and the lid end portion 7 is formed into a rectangular configuration with rounded corners, conforming to the open end portion 6 of the body portion 31.

A metal material with its surface covered with an electrically insulating resin (insulating layer) is suitable as a material that constitutes the container main body 3 and the lid body 5. For instance, an aluminum sheet with its front and back side surfaces covered with a PET resin film is preferable. For such an aluminum sheet, a 5052 AL material of a thickness of 0.5 mm is preferable, and it is also preferable that the PET resin film located on an inner side of the container be 20 microns, and that the PET resin film located on an outer side thereof be 20 microns.

A first and a second notched hole 91, 92, from which the plus terminal 22 and the minus terminal 23 connected with the flat battery pack 2 in the container are exposed to the outside, are formed in the first side wall 31a of the metal container main body 3 at the left and right sides thereof at a predetermined distance apart from each other. In addition, a third notched hole 93, from which the voltage measuring connector 26 of each of the laminate type batteries 21 constituting the flat battery pack 2 is exposed to the outside, is formed in the first side wall 31a of the metal container main body 3 at a location intermediate between the first and second notched holes 91, 92.

The first and second notched holes 91, 92 are in the form of U shapes, respectively, conforming to the configurations of the terminal insulation resin covers 24, 25 that cover the plus terminal 22 and the minus terminal 23, respectively, and includes two pairs of right and left side edge portions 91a, 91b; 92a, 92b extending linearly from the upper open end portion 6 of the first side wall 31a toward its lower end corners near the bottom plate portion 32 in parallel with each other, and circular-arc shaped lower edge portions 91c, 92c each connecting between the lower ends of the corresponding side edge portions 91a, 91b; 92a, 92b.

The third notched hole 93 is rectangular, and includes a pair of right and left side edge portions 93a, 93b extending linearly from the upper open end portion of the first side wall 31a toward its lower end corners near the bottom plate portion 32 in parallel with each other, and a rectilinear lower edge portion 93c connecting between the lower ends of the side edge portions 93a, 93b. The lower edge portion 93c extends along the lower end corners. Also, formed in the metal lid 5 is a fifth lid-side notched hole 95 continuously extending from the third notched hole 93. The lid-side notched hole 95 takes the form of a rectangular configuration with the same width as that of the third notched hole 93, and extends a predetermined length from an end of the metal lid 5 in a direction perpendicular to the first side wall 31a, so that the third notched hole 93 and the fifth notched hole 95 are combined with each other to form one notched hole.

A fourth notched hole 94 is formed in the second side wall 31b at the central location thereof. This fourth notched hole 94 extends across a lower end corner of the second side wall 31b to enter the bottom plate portion 32 a predetermined length.

Reinforcement beads 10 are formed on the first side wall 31a around the peripheral portions of the first notched hole 91, the second notched hole 92 and the third notched hole 93 formed therein, and on the second side wall 92 around the peripheral portion of the fourth notched hole 94 formed therein. Thus, these first and second side walls 91, 92 with the reinforcement beads 10 become more rigid than the other portions without any notched hole formed therein (e.g., the third and fourth side walls 31c, 31d on the long side in this example).

Each of the reinforcement beads 10 is a convex row or bar of a predetermined width that protrudes from the surface of the container toward the outside thereof or a concave row or bar recessed or depressed from the surface of the container toward the outside thereof, and is of such a structure that it extends vertically in a line over the entire height of the first and second side walls 31a, 31b.

Since the first notched hole 91 and the second notched hole 92 of the first side wall 31a are located adjacent to corners of high rigidity, a plurality of (e.g., three in the illustrated example) reinforcement beads 10 are arranged at predetermined peripheral intervals in a region between the first notched hole 91 and the third notched hole 93 as well as in a region between the third notched hole 93 and the second notched hole 92. In particular, reinforcement beads 10 arranged in the immediate vicinity of the first notched hole 91, the second notched hole 92 and the third notched hole 93 are adjoined to the side edges of the notched holes 91, 92.

The reinforcement beads 10 on the second side wall 31b are provided in pluralities (e.g., two at each side in the illustrated example) in a right and a left region of the fourth central notched hole 94. Those among the plurality of reinforcement beads 10 which are arranged adjacent to the fourth notched hole 94 are arranged in close proximity of the fourth notched hole 94.

The battery outer case of the above construction is assembled as follows.

That is, the metal container main body 3 is first molded which has the first, second, third and fourth notched holes 91, 92, 93 and 94 formed in the first and second side walls 31a, 31b of the body portion 31 thereof, and the flat battery pack 2 is received in the metal container main body 3 thus molded. Upon receiving of the flat battery pack 2, the insulating resin portions 24, 25 of the plus terminal 22 and the minus terminal 23 are fitted into the first and second notched holes 91, 92, respectively.

Next, the metal lid 5 is placed onto the metal container main body 3 in such a manner that the lid-side notched hole 95 is aligned with the third notch hole 93, and then the open end portion of the metal container main body 3 and the lid end portion of the metal lid 5 are superposed with each other and double seamed to form the seam portions 8, thus completing the coupling therebetween.

Figure 2A:
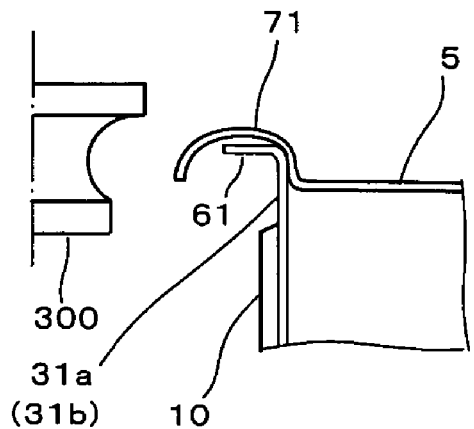
FIGS. 2A through 2C are views for explaining the function of a reinforcement bead in a seaming step.
Figure 2B:
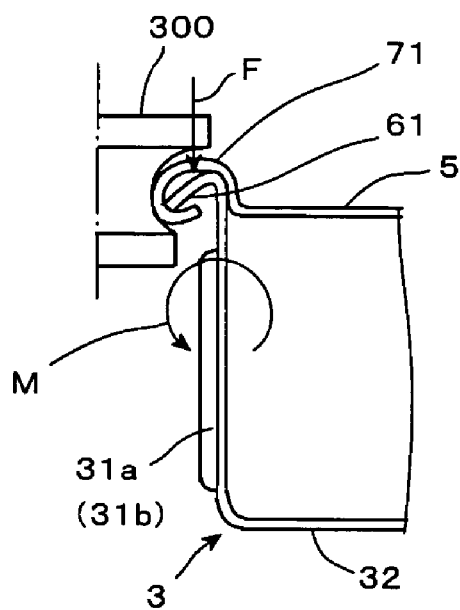
Figure 2C:
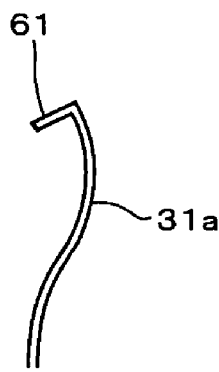

As shown in FIGS. 2A and 2B, a seam curl portion 71 formed at the lid end portion 7 of the metal lid 5 and a seam flange portion 61 formed at the open end portion 6 of the metal container main body 3 are superposed with each other and seam joined to each other by pressing a seam roll 300 against these portions 71, 61 from a side thereof, but the first side wall 31a and the second side wall 31b of the metal container main body 3 are subject to an axial compression load F and a bending moment M from the seam flange portion 61. Since the peripheral portions of the metal container main body 3 having the notches formed therein are low in rigidity, they can be easily buckling deformed under the action of the compression load F and the bending moment M, as shown in FIG. 2C, if absence of any reinforcement beads 10. In this embodiment, however, the flexural rigidity of the notched peripheral portions of the side wall sections are raised by the reinforcement beads 10, so that the notched peripheral portions of the first side wall section 31a and the second side wall section 31b can be prevented from deformation.

Figure 2D:
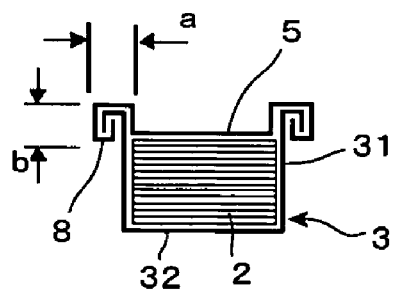
FIG. 2D is a view showing how large seam portions are.

The dimensions of the seam portions 8 are such that they have a width a of at most 3 mm and a height b of at most 3 mm, as shown in FIG. 2D, and hence the occupation space can be reduced as compared with conventional welding or caulking. In addition, there is caused no thermal deformation of the container and no thermal damage to the flat battery pack 2, as will be in the case of welding.

Further, the first and second notches 91, 92 are formed beforehand, so that when the flat battery pack 2 is received in the metal container main body 3, the terminal insulation resin covers 24, 25 of the plus terminal 22 and the minus terminal 23 can be fitted into the first and second notched holes 91, 92 from above. As a result, the flat battery pack 2 can be received smoothly in the metal container main body 3 from above the opening portion 4 thereof.

Moreover, in this embodiment, it is constructed such that the inside of the container in which the flat battery pack 2 is received is in communication with the outside thereof through the first through fourth notched holes 91, 92, 93 and 94 or through the seam portions 8 so as to have air permeability. Accordingly, even if gas is generated in the thin batteries that constitute the flat battery pack and the gas thus generated flows out to the outside of the thin batteries, the gas can be escaped to the outside of the container. The seam portions 8 will be of a structure having air permeability if no compound is interposed therebetween.

Next, another embodiment of the present invention will be described while referring to FIGS. 3A through 3D. In the following description, only differences from the above-mentioned embodiment will be explained with the same components being identified by the same symbols while omitting an explanation thereof.

Figure 3A:
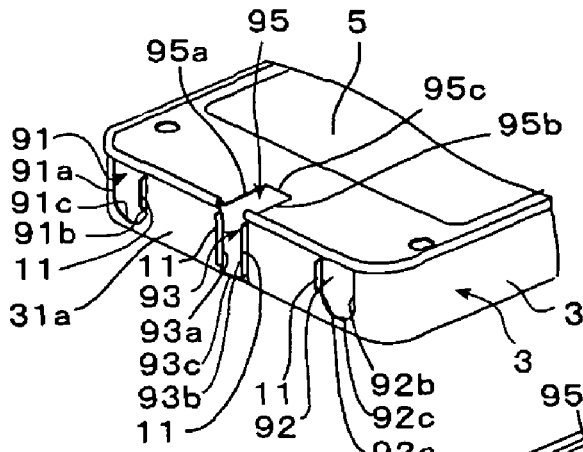
FIG. 3A is a perspective view of essential portions of a battery outer case according to another embodiment of the present invention with a thin battery assembly therein being permitted.

In FIG. 3A, the peripheral portions around the first and second notched holes 91, 92 and the third notched hole 93 are bent or turned back to form upright ribs 11 in the form of turned back portions for improved rigidity without forming any reinforcement bead.

That is, the first and second notched holes 91, 92 are arranged at their one side adjacent to corners and have high rigidity at that side, so upright ribs 11 are formed at their side edges 91b, 92a opposing the third notch 93. On the other hand, the third notch 93 is formed at its opposite side edges with upright ribs 11. These upright ribs 11 are constructed in such a manner that they are bent or turned back in a direction to protrude outside of the container to form a U-shaped configuration, with the inner surface side of the container being exposed to the surface thereof.

Figure 3B:
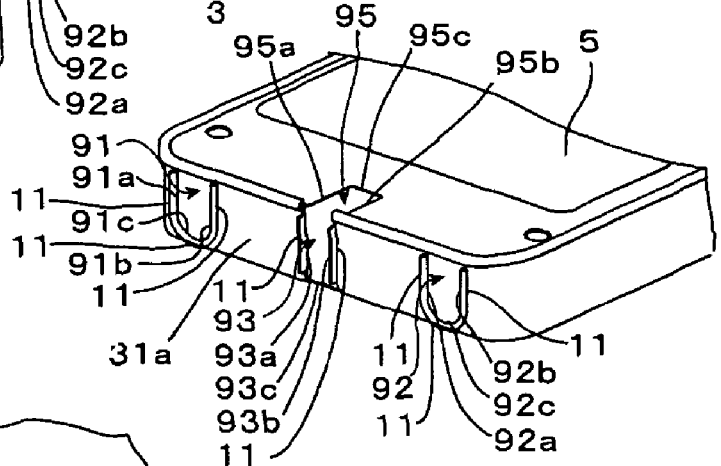
FIG. 3B is a perspective view of essential portions of a battery outer case according to a further embodiment of the present invention with a thin battery assembly therein being permitted.
Figure 3C:
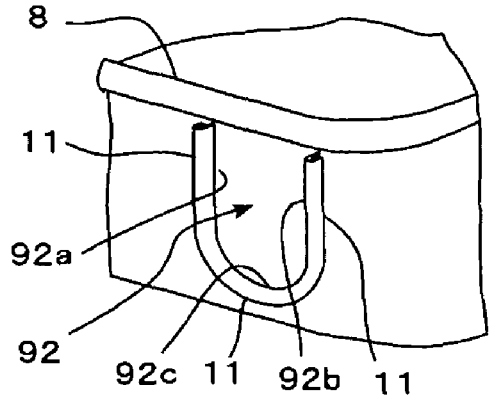
FIG. 3C is an enlarged perspective view of a notched portion.
Figure 3D:
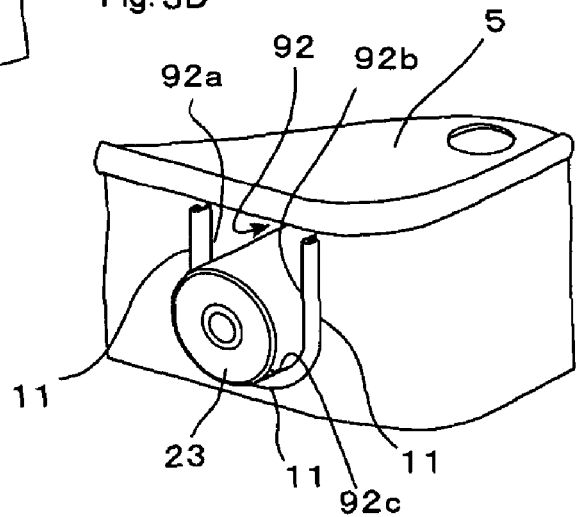
FIG. 3D is a perspective view showing a state in which a terminal protrudes from a notched hole of FIG. 3C.
Figure 4A:
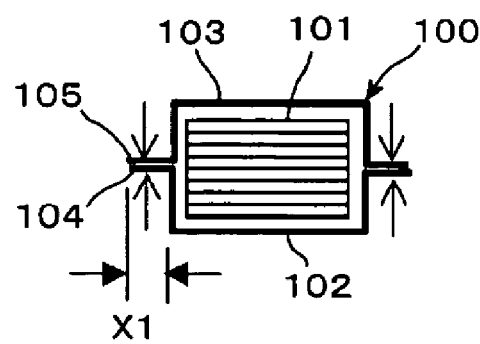
Figure 4B:
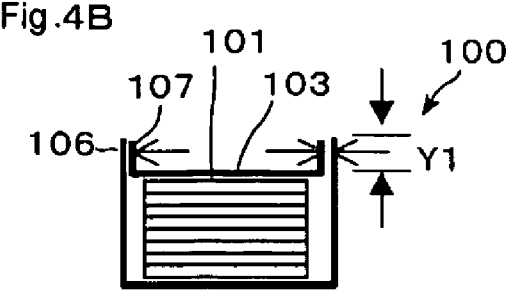
Figure 4C:
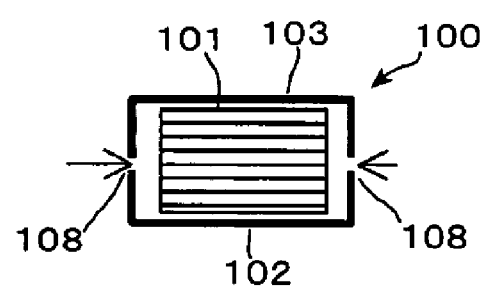
Figure 4D:
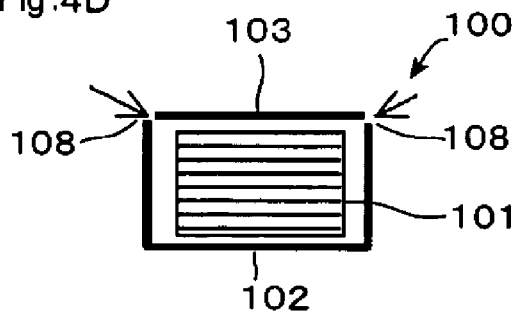
Figure 4E:
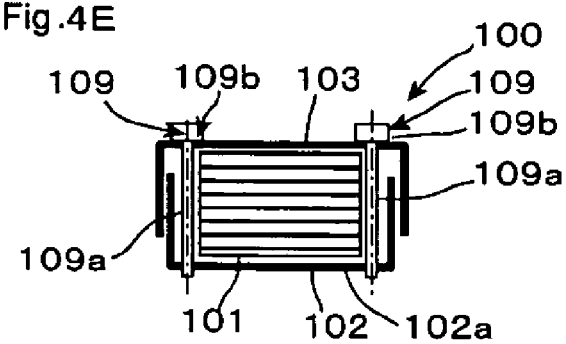
Figure 4F:
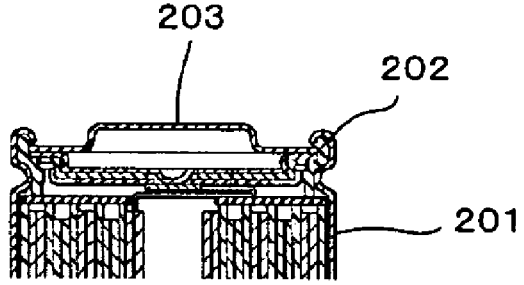

Further, FIG. 3B through 3D show a further embodiment of the present invention.

In this embodiment, for the first and second notched holes 91, 92 through which terminals 22, 23 are exposed, at least the inner surface of the metal container main body 3 is coated with an insulating layer, and the upright ribs 11 in the form of the turned back portions are formed to extend over the right and left side edge portions 91a, 91b; 92a, 92b and the circular-arc shaped lower edge portions 91c, 92c, whereby electrical insulation of the plus terminal 22 and the minus terminal 23 as well as structural reinforcement can be made. With such a construction, the plus terminal 22 and the minus terminal 23 can be electrically insulated without the metal material of the metal container being exposed to the sections of the first and second notched holes 91, 92, so the terminal insulation resin covers 24, 25 become unnecessary.

Although in the above embodiments, there has been shown an example of the metal container main body 3 in which the body portion 31 and the bottom plate portion 32 are integrally molded with each other, the body portion 31 and the bottom plate portion 32 may be formed separately from each other.

While the invention has been described in terms of preferred embodiments, those skilled in the art will recognize that the invention can be practiced with modifications within the spirit and scope of the appended claims.

What is claimed is:

1. A battery outer case comprising:
    a metal container main body having at least one surface opened with a flat battery pack received therein; and
    a metal lid that serves to close an opening formed in said metal container main body;
    wherein the inside of said container is in communication with the outside thereof so as to have air permeability along the entirety of a seam-rolled joint that is formed when an open end periphery of said metal container main body and a lid end periphery of said metal lid are joined to each other by seam rolling, whereby any gas generated inside said container escapes to the outside of said container through said seam-rolled joint, wherein said metal container main body is provided with notched holes through which terminals connected to said flat battery pack inside said container are exposed.

2. The battery outer case as set forth in claim 1, wherein said flat battery pack is composed of laminate type batteries laminated one over another.

3. The battery outer case as set forth in claim 1, wherein said metal container main body has a peripheral portion around each of said notched holes which is more rigid than the other portions thereof.

4. The battery outer case as set forth in claim 3, wherein a reinforcement bead is formed at a location near each of said notched holes in said metal container main body so as to provide high rigidity.

5. The battery outer case as set forth in claim 3, wherein said metal container main body has a turned back portion formed around each of said notched holes so as to provide high rigidity.

6. The battery outer case as set forth in claim 1, wherein said metal container main body and said metal lid have at least their inner surfaces coated with insulating layers, respectively.

* * * * *

UNITED STATES PATENT AND TRADEMARK OFFICE
CERTIFICATE OF CORRECTION

| | | |
|---|---|---|
| PATENT NO. | : 7,910,241 B2 | Page 1 of 1 |
| APPLICATION NO. | : 11/225828 | |
| DATED | : March 22, 2011 | |
| INVENTOR(S) | : Ryuichi Amagai et al. | |

It is certified that error appears in the above-identified patent and that said Letters Patent is hereby corrected as shown below:

Title Page, Item (75) Second Inventor's Address, should be: -- Atsughi --

Third Inventor's Address, should be: -- Yokohama --

Title Page, Item (73) Second Assignee Name, should be: -- Toyo Seikan Kaisha, Ltd. --

Signed and Sealed this
Ninth Day of August, 2011

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,910,241 B2 |
| APPLICATION NO. | : 11/225828 |
| DATED | : March 22, 2011 |
| INVENTOR(S) | : Ryuichi Amagai et al. |

It is certified that error appears in the above-identified patent and that said Letters Patent is hereby corrected as shown below:

Title Page, Item (75) Second Inventor's Address, should be: -- Atsugi --
                              Third Inventor's Address, should be: -- Yokohama --

Title Page, Item (73) Second Assignee Name, should be: -- Toyo Seikan Kaisha, Ltd. --

This certificate supersedes the Certificate of Correction issued August 9, 2011.

Signed and Sealed this
Twenty-seventh Day of September, 2011

David J. Kappos
*Director of the United States Patent and Trademark Office*